United States Patent
Roberts et al.

(10) Patent No.: US 10,592,144 B2
(45) Date of Patent: Mar. 17, 2020

(54) STORAGE SYSTEM FABRIC WITH MULTICHANNEL COMPUTE COMPLEX

(71) Applicant: Western Digital Technologies, Inc., San Jose, CA (US)

(72) Inventors: Adam Roberts, Moncure, NC (US); Sivakumar Munnangi, San Jose, CA (US); John Scaramuzzo, Los Gatos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/054,980

(22) Filed: Aug. 3, 2018

(65) Prior Publication Data

US 2020/0042217 A1    Feb. 6, 2020

(51) Int. Cl.
| | |
|---|---|
| G06F 3/06 | (2006.01) |
| G06F 13/38 | (2006.01) |
| G06F 9/50 | (2006.01) |
| G06F 15/173 | (2006.01) |

(52) U.S. Cl.
CPC .......... *G06F 3/0635* (2013.01); *G06F 3/0607* (2013.01); *G06F 3/0655* (2013.01); *G06F 3/0659* (2013.01); *G06F 3/0689* (2013.01); *G06F 9/50* (2013.01); *G06F 13/385* (2013.01); *G06F 15/17331* (2013.01); *G06F 3/0629* (2013.01); *G06F 2209/509* (2013.01)

(58) Field of Classification Search
CPC .............................. G06F 3/0329; G06F 3/0655
See application file for complete search history.

(56) References Cited

U.S. PATENT DOCUMENTS

| | | |
|---|---|---|
| 5,530,948 A | 6/1996 | Islam |
| 7,680,837 B2 | 3/2010 | Yamato |
| 7,934,055 B2 | 4/2011 | Flynn et al. |
| 8,473,648 B2 | 6/2013 | Chakhaiyar et al. |
| 8,583,853 B1 | 11/2013 | Lee et al. |
| 9,009,565 B1 | 4/2015 | Northcott et al. |
| 9,118,698 B1 | 8/2015 | Radovanovic |
| 9,448,924 B2 | 9/2016 | Sundaram et al. |
| 9,720,596 B1 | 8/2017 | Bono et al. |
| 2003/0046497 A1 | 3/2003 | Dandrea |

(Continued)

FOREIGN PATENT DOCUMENTS

WO    2013022915 A1    2/2013

OTHER PUBLICATIONS

International Search Report and Written Opinion of Application No. PCT/US2019/020155 ISR & WO, dated Jun. 27, 2019, p. 1-11.

(Continued)

*Primary Examiner* — Zachary K Huson
(74) *Attorney, Agent, or Firm* — Patent Law Works LLP

(57) ABSTRACT

Example storage systems and methods provide multichannel communication among subsystems, including a compute complex. A plurality of storage devices, a host, and a compute complex are interconnected over an interconnect fabric. The storage system is configured with a host-storage channel for communication between the host and the plurality of storage devices, host-compute channel for communication between the host and the compute complex, and a compute-storage channel for communication between the compute complex and the storage devices.

20 Claims, 5 Drawing Sheets

(56) References Cited

U.S. PATENT DOCUMENTS

| | | |
|---|---|---|
| 2008/0034153 A1 | 2/2008 | Lee et al. |
| 2009/0150605 A1 | 6/2009 | Flynn et al. |
| 2011/0072207 A1 | 3/2011 | Jin et al. |
| 2012/0179869 A1 | 7/2012 | Flynn et al. |
| 2012/0278686 A1 | 11/2012 | Tang et al. |
| 2012/0284460 A1 | 11/2012 | Guda |
| 2013/0046949 A1 | 2/2013 | Colgrove et al. |
| 2014/0025770 A1 | 1/2014 | Warfield et al. |
| 2014/0101369 A1 | 4/2014 | Tomlin et al. |
| 2014/0258598 A1 | 9/2014 | Canepa et al. |
| 2014/0365719 A1 | 12/2014 | Kuzmin et al. |
| 2015/0067244 A1 | 3/2015 | Kruger |
| 2015/0089282 A1 | 3/2015 | Taranta, II |
| 2015/0254178 A1 | 9/2015 | Van Aken |
| 2016/0054920 A1 | 2/2016 | Patterson, III |
| 2016/0070652 A1 | 3/2016 | Sundararaman et al. |
| 2016/0179403 A1 | 6/2016 | Kurotsuchi et al. |
| 2016/0320989 A1 | 11/2016 | Bromberg et al. |
| 2016/0357461 A1 | 12/2016 | Tsao et al. |
| 2016/0371145 A1 | 12/2016 | Akutsu et al. |
| 2017/0177237 A1 | 6/2017 | Schnapp et al. |
| 2017/0185543 A1* | 6/2017 | Nieuwejaar ............ G06F 3/061 |
| 2017/0206260 A1 | 7/2017 | Wei et al. |
| 2018/0054217 A1 | 2/2018 | Schwaderer |

OTHER PUBLICATIONS

International Search Report and Written Opinion of Application No. PCT/US2018/052376, dated Dec. 10, 2018, p. 1-13.

International Search Report and Written Opinion of Application No. PCT/US2018/052389, dated Dec. 10, 2018, p. 1-13.

International Search Report and Written Opinion of Application No. PCT/US2019/020165, dated Jun. 21, 2019, p. 1-16.

Zhang, Jiacheng, et al., ParaFS: A Log-Structured File System to Exploit the Internal Parallelism of Flahs Devices,: 2016 USENIX Annual Technical Conference, Jun. 22-24, 2016, 15 pages.

* cited by examiner

STORAGE SYSTEM FABRIC WITH MULTICHANNEL COMPUTE COMPLEX

TECHNICAL FIELD

The present disclosure generally relates to data storage systems, and in a more particular example, to disaggregated data storage systems using interconnect fabrics for multichannel communication among storage system components.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips from Mellanox or Kazan to translate commands from external NVMe-OF™ (Non-Volatile Memory Express™ over Fabrics) protocol to internal NVMe (NVM Express™) protocol. These architectures may not make the best use of the I/O bandwidth, processing, and buffer memory of the individual storage devices, such as solid-state drives (SSDs) in such systems. In addition, some of these architectures place significant compute resources in a centralized storage controller, which may lead to challenges scaling solutions as the number and size of SSDs increases.

Even with disaggregated storage architectures, rapid development cycles and the desire to reconfigure and scale storage solutions on an ongoing basis to meet increasing demands may require flexible systems that separate host interface considerations from scalable storage device, storage controller, and specialized data processing and data management features.

Therefore, there still exists a need for fabric-based storage systems with scalable subsystem resources and a supporting hardware/software architecture.

SUMMARY

Various aspects for fabric-based storage systems with multichannel communication among subsystems, including a compute complex, are described. In an innovative aspect, a storage device comprises an interconnect fabric interconnecting a plurality of storage devices, a network interface, and a compute subsystem. The interconnect fabric comprises a network communication module configured for communication through the network interface to a host system and a device interconnect module configured for communication with at least the plurality of storage devices. A channel configuration comprises a host-storage channel configured for communication between the host system and the plurality of storage devices that bypasses the compute subsystem, a host-compute channel configured for communication between the host system and the compute subsystem that bypasses the plurality of storage devices, and a compute-storage channel configured for communication between the compute subsystem and the plurality of storage devices that bypasses the host system.

In various embodiments, a plurality of storage devices may each comprise a storage processor, a storage operating memory, at least one storage media, and an interconnect interface in communication with the interconnect fabric. The channel configuration may further comprise a storage-storage channel configured for communication among the plurality of storage devices that bypasses the host system and the compute subsystem. The plurality of storage devices may each further comprise a storage remotely addressable memory configured for access through the interconnect fabric. The host-storage channel may be further configured for data transfers between the host system and the plurality of storage devices using the storage remotely addressable memory. The plurality of storage devices may each further comprise an offload services module. The offload services module may be configured to use the storage processor and the storage operating memory to execute an offload task received over the interconnect fabric from an offloading system selected from the host system or the compute subsystem. The offload task may not use the at least one storage media.

In some embodiments, the interconnect fabric may support at least one communication protocol selected from: non-volatile memory over fabric (NVMe over Fabric), peripheral component interconnect express (PCIe), Infini-Band (IB), Omni-Path, remote direct memory access (RDMA) over converged ethernet (RoCE), Fibre channel over Fabric, and internet wide-area RDMA protocol (iWARP). The compute subsystem may further comprise a compute remotely addressable memory configured for access through the interconnect fabric. The compute-storage channel may be further configured for data transfers between the compute subsystem and the plurality of storage devices using the compute remotely addressable memory. The host-compute channel may be further configured for data transfers between the compute subsystem and the host system using the compute remotely addressable memory.

In some embodiments, the compute subsystem may further comprise a subsystem processor, a subsystem operating memory, and a host offload services module. The host offload services module may be configured to use the subsystem processor and the subsystem operating memory to execute a host offload task received over the network interface from the host system. The host offload task may be selected from a data query processing offload task, a data content processing offload task, and a data relationship processing offload task. The compute subsystem may further comprise a storage services module. The storage services module may be configured to use the subsystem processor and the subsystem operating memory to execute at least one storage services task for managing the plurality of storage devices. The storage services task may be selected from a write buffering task, a data serialization task, a redundant array of independent disks (RAID) management task, a host flash translation layer (FTL) management task, and a host logical block address management task. The compute subsystem may further comprise at least one interface protocol driver. The at least one interface protocol driver may be configured to use the subsystem processor and the subsystem operating memory to execute at least one communication protocol for at least one communication channel selected from the network interface or the interconnect fabric.

In another innovative aspect, a computer-implemented method for execution by a storage system configures and uses a multi-channel compute subsystem. A plurality of storage devices, a host system, and a compute subsystem are interconnected for communication over an interconnect fabric. A host-storage channel is configured for communication over the interconnect fabric between the host system and the plurality of storage devices and bypasses the compute subsystem. A host-compute channel is configured for communication over the interconnect fabric between the host system and the compute subsystem and bypasses the plurality of storage devices. A compute-storage channel is configured for communication over the interconnect fabric between the compute subsystem and the plurality of storage devices and bypasses the host system. A host storage operation is executed from the host system to the plurality of storage devices. The host data is transferred through the host-storage channel.

In various embodiments, a storage-storage channel may be configured for communication over the interconnect fabric among the plurality of storage devices that bypasses the host system and the compute subsystem. A peer storage operation may be executed between a first storage device of the plurality of storage devices and a second storage device of the plurality of storage devices. The plurality of storage devices may each comprise a storage processor, a storage operating memory, and at least one storage media. A host offload task may be executed using the storage processor and the storage operating memory. The host offload task may be received over the interconnect fabric from the host system.

In some embodiments, the compute subsystem may comprise a subsystem processor and a subsystem operating memory. A host offload task may be executed using the subsystem processor and the subsystem operating memory. The host offload task is received over the interconnect fabric from the host system. At least one storage services task may be executed using the subsystem processor and the subsystem operating memory. The at least one storage services task may manage the plurality of storage devices over the interconnect fabric. At least one communication protocol for the interconnect fabric may be executed using the subsystem processor and the subsystem operating memory.

In yet another innovative aspect, a storage system includes a plurality of storage devices, a host system, and a compute subsystem comprising a subsystem processor and a subsystem operating memory. Means are provided for interconnecting the plurality of storage devices, the host system, and the compute subsystem for communication over an interconnect fabric. Means are provided for configuring a host-storage channel for communication over the interconnect fabric between the host system and the plurality of storage devices that bypasses the compute subsystem. Means are provided for configuring a host-compute channel for communication over the interconnect fabric between the host system and the compute subsystem that bypasses the plurality of storage devices. Means are provided for configuring a compute-storage channel for communication over the interconnect fabric between the compute subsystem and the plurality of storage devices that bypasses the host system. Means are provided for executing a host offload task received by the compute subsystem from the host system over the host-compute channel. The host offload task is executed using the subsystem processor and the subsystem operating memory.

The various embodiments advantageously apply the teachings of disaggregated storage systems to improve the functionality of such computer systems. The various embodiments include operations to overcome or at least reduce the issues in the previous storage systems discussed above and, accordingly, are more flexible and scalable than other computer data storage architectures for some applications. That is, the various embodiments disclosed herein include hardware and/or software with functionality to improve the flexibility and scalability of storage systems, based on using multichannel communication among subsystems, including a specialized compute complex. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
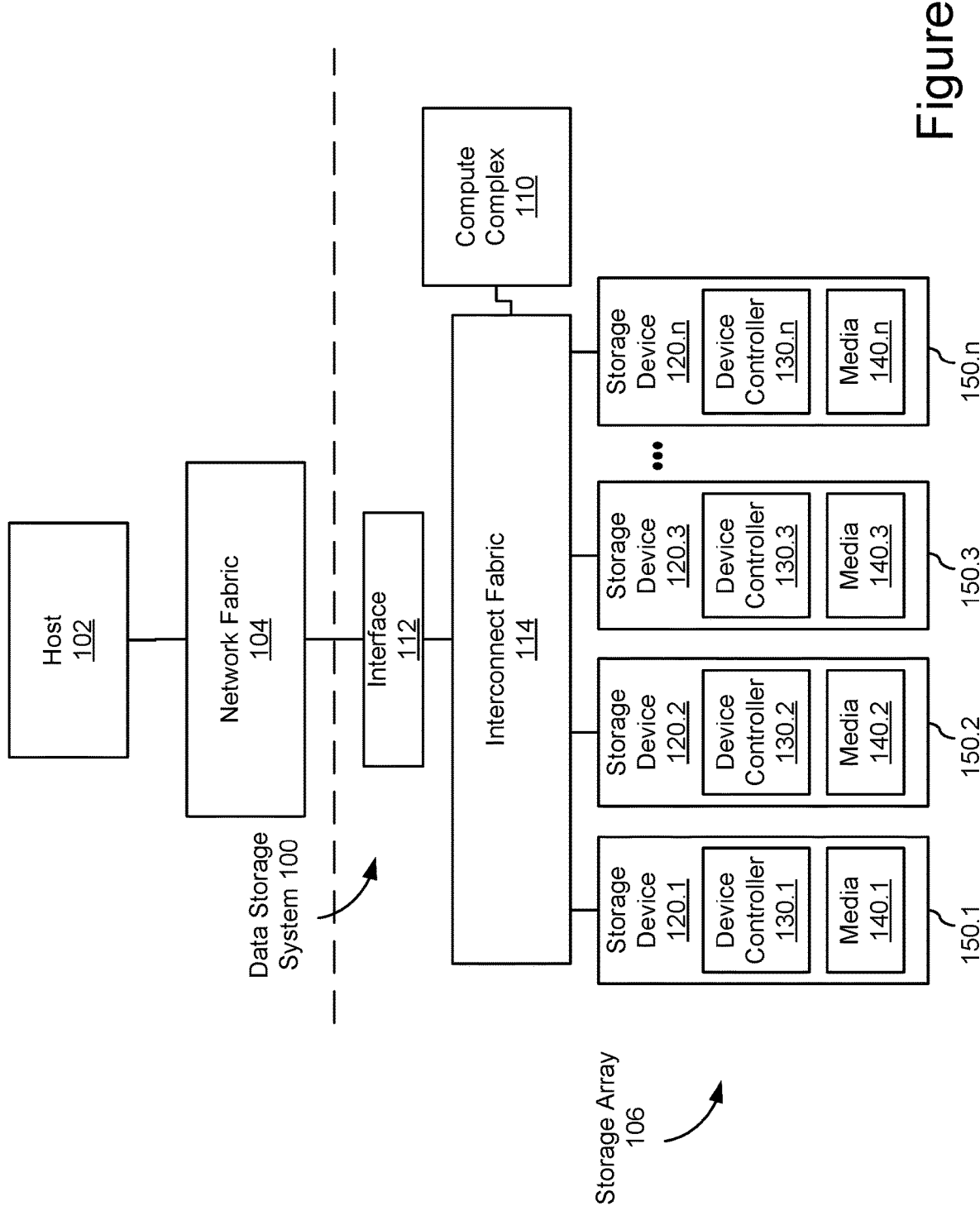
FIG. 1 schematically illustrates an example of a disaggregated storage system.

FIG. 1 shows an embodiment of an example data storage system 100. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or memory devices).

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single media device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Compute complex 110, also referred to as a compute subsystem, is coupled to data storage devices 120.1-120.n through interconnect fabric 114. However, in some embodiments, compute complex 110 may be hosted as a component and/or a subsystem of another component of data storage system 100. For example, in some embodiments, some or all of the functionality of compute complex 110 may be implemented by software executed on one or more compute resources in at least one of data storage devices 120.1-120.n, interconnect fabric 114, or interface 112. In some embodiments, compute complex 110 may implement some or all functions of a storage controller, sometimes called a controller system, a main controller system, a non-volatile memory express (NVMe) controller, garbage collection (GC) leader, or storage virtualization controller (SVC). In some embodiments, a device controller 130.1 associated with a particular storage device (e.g., 120.1) acts as a storage controller for other storage devices (e.g., 120-2, 120-3, and 120.n) in data storage system 100 and compute complex 110 may implement other data processing and/or data management functions.

In some embodiments, compute complex 110 may be implemented in hardware associated with interconnect fabric 114, interface 112, and/or network fabric 104. For example, compute complex 110 may share a physical structure, such as a circuit board, package, or chipset, with networking components, such as network adapters, network interface cards, or network switch controllers. In some embodiments, the compute resource, such as one or more processors, operating memory, and/or persistent memory, may be used to implement one or more functions of the interconnect fabric 114, interface 112, and/or network fabric 104.

In some embodiments, host 102 is coupled to data storage system 100 through interface 112 over a network fabric 104. In some embodiments, multiple hosts 102 (only one of which is shown in FIG. 1) are coupled to data storage system 100 through interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, at least a portion of network fabric 104 may be implemented using Ethernet protocols and wired networking hardware to connect to data storage system 100 through interface 112.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from compute complex 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with compute complex 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140. In some embodiments, interconnect fabric 114 may include an interconnect backplane for physically connecting to storage devices 120.

In some embodiments, however, compute complex 110, the one or more device controllers 130, and media devices 140 are included in the same device (i.e., an integrated device) as components thereof. Furthermore, in some embodiments, one or more of the storage devices 120 (e.g., including compute complex 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with compute complex 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
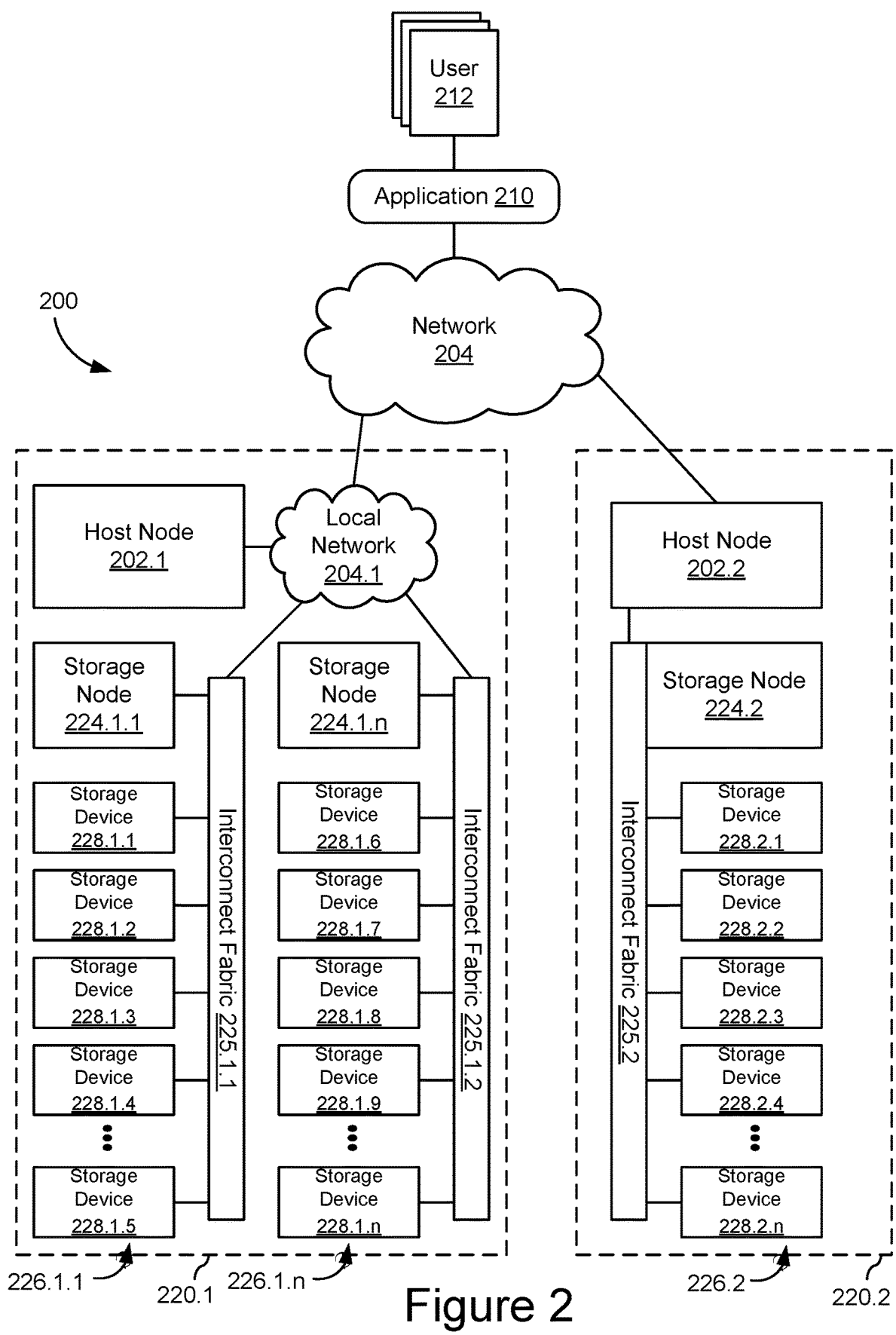
FIG. 2 schematically illustrates an example network environment for a disaggregated storage system.

FIG. 2 shows an embodiment of an example storage system 200, such as a storage system implementing one or more disaggregated storage systems. Storage system 200 may be implemented as a plurality of disaggregated storage systems which is coupled to an application 210 for accessing, storing, and using data stored in storage system 200. The connection between storage system 200 and application 210 could, for example, be implemented as a suitable data communication network 204, such as a LAN, WAN, internet, etc. Application 210 could, for example, be a dedicated software application running on a computing device, such as a personal computer, a laptop, a wireless telephone, a personal digital assistant or any other type of communication device that is able to interface directly with the storage system 200. In some embodiments, application 210 could, for example, comprise a suitable file system which enables a general purpose software application to interface with storage system 200, an application programming interface (API) library for the storage system 200, etc. In some embodiments, application 210 may be a user application, such as business or personal application instantiated in a local, client/server, web, and/or mobile application that enables users 212 to interact with data stored in storage system 200.

As further shown in FIG. 2, storage system 200 comprises two storage locations 220 implementing disaggregates storage architectures. Each storage location 220 may include a host node 202 and one or more storage nodes 224 which may be coupled in a suitable way for transferring data, for example by means of interconnect fabrics 225 and/or local network 204.1. Each of storage nodes 224 may further connect to a plurality of storage devices 228 arranged in storage arrays 226. Host nodes 202, storage nodes 224, and storage devices 228 may connect to the data communication network 204 and each other by means of suitable wired, wireless, optical, etc. network connections or any suitable combination of such network connections. Although the example of Figures shows only a two host nodes 202, three storage nodes 224, three storage arrays 226, and fifteen storage devices 228, storage system 200 could comprise any other suitable number of host nodes 202, storage nodes 224, and storage devices 228 arranged in any number of storage arrays 226.

These host nodes 202 and storage nodes 224 can be built as general-purpose computers, however more frequently they are physically adapted for arrangement in large data centers, where they are arranged in modular racks comprising standard dimensions. Exemplary host nodes 202 and storage nodes 224 may be dimensioned to take up a single unit of such rack, which is generally referred to as 1U. Such an exemplary storage node 224 may use a low-power processor and may be equipped with ten or twelve high capacity serial advanced technology attachment (SATA) storage devices 228 (even though only five storage devices 228 are shown for each storage node 224) and is connectable to the network over redundant Ethernet network interfaces. In some embodiments, storage nodes 224 may include a compute complex providing storage controller or other storage-related functionality.

An exemplary host node 202 may comprise high-performance servers and provide network access to applications 210 over multiple high bandwidth Ethernet network interfaces. Data can be transferred between applications 210 and such a host node 202 by means of a variety of network protocols including hypertext transfer protocol (HTTP)/ representational state transfer (REST) object interfaces, language-specific interfaces such as Microsoft .Net, Python or C, etc. Additionally, such controller nodes may comprise additional high bandwidth Ethernet ports to interface with the storage nodes 30. In some embodiments, HTTP/REST protocols complying with S3 may enable data transfer through a REST application protocol interfaces (API). Preferably, such host nodes 202 operate as a highly available cluster of host nodes, and provide for example shared access to the storage nodes 224, metadata caching, protection of metadata, etc.

Several storage nodes 224 can be grouped together, for example because they are housed in a single rack or a single physical location 220.1. For example, storage nodes 224.1.1 to 224.1.n may be grouped in physical location 220.1 and support host node 202.1, while storage node 224.2 may be located in physical location 220.2 and support host node 202.2. These physical locations 220 are not required to be located at the same geographic location, they are often geographically dispersed across different data centers. For example, physical location 220.1 can be located at a data center in Europe and physical location 220.2 at a data center in China.

Figure 3:
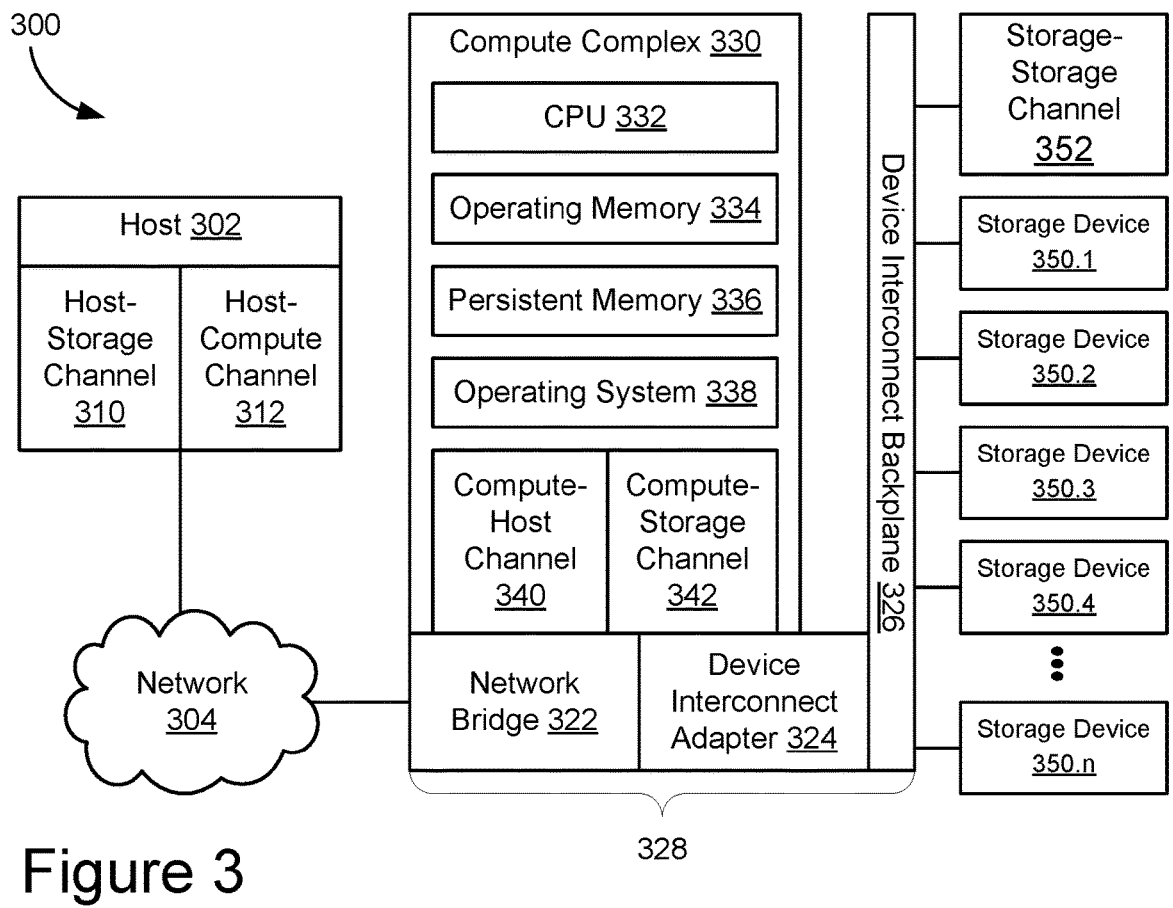
FIG. 3 schematically illustrates an example of a multi-channel storage system.

FIG. 3 is a block diagram illustrating a data storage system 300 implementing a multichannel architecture among host system 302, compute complex 330, and storage devices 350, in accordance with some embodiments. In the embodiment shown, compute complex 330 is integrated with network bridge 322 and device interconnect adapter 324 (or device interconnect module), which are connected to device interconnect backplane 326 to form an interconnect fabric 328. Network bridge 322 may act as a network communication module configured for communication through a network interface for connecting to network 304. Host 302 may communicate through network 304 into interconnect fabric 328.

Each channel in data storage system 300 may be defined by one or more networks that enable a system or component to uniquely address another system or component in that channel using the hardware and protocols of the interconnecting fabrics (interconnect fabric 328 and/or the network fabric supporting network 304). These channels enable data frames or packets to be forwarded and/or routed between the two components without involving the compute resources of any bypassed components.

In some embodiments, host 302 may be a host controller similar to host node 202.1 in FIG. 2 and/or host 102 in FIG. 1. Host 302 may support one or more applications supported by data stored in storage devices 350. In some embodiments, host 302 may be part of or interface with any number of storage systems, including storage system 300. Host 302 may include application-level data abstractions and data storage protocols that define logical block addresses, file systems, object storage systems, or other logical architectures for storing and accessing data stored in storage devices 350. Host 302 may implement application-level data management for configuring and accessing data stored in storage devices 350. In some embodiments, host 302 may generate host data commands for accessing and managing data stored in storage devices 350.

In some embodiments, host 302 may be configured to support a host-storage channel 310 for communicating with storage devices 350 and a host-compute channel 312 for communicating with compute complex 330. For example, host data for transfer to or from storage devices 350 may be routed through host-storage channel 310 through network bridge 322 and device interconnect adapter 324 and bypass the resources of compute complex 330. Data management commands and/or host offload commands may be sent to compute complex 330 through host-compute channel 312 and bypass storage devices 350. In some embodiments, some host commands may be directed through host-compute channel 312 and result in compute complex 330 accessing, managing, or otherwise interacting with storage devices 350 in response to the host command. For example, where compute complex 330 is acting as a storage virtualization controller, host commands may initially be directed to compute complex 330 in order to coordinate use of host-storage channel 310 and initiate or manage host-storage interactions.

In some embodiments, compute complex 330 may include compute resources, such as one or more processing units (CPU 332), operating memory 334, persistent memory 336, and/or operating system 33. In some embodiments, CPU 332, operating memory 334, persistent memory 336, and any number of additional modules may be packaged as an independent compute complex interfacing with the interconnect-related components of interconnect fabric 328 and implemented in an application-specific integrated circuit (ASIC), system on a chip (SoC), field programmable gate array (FPGA), or similar architecture. In some embodiments, one or more components of network bridge 322 and/or device interconnect adapter 324 may be implemented in the same hardware unit as CPU 332, operating memory 334, and persistent memory 336. In some embodiments, the compute resources of compute complex 330 may be interconnected by one or more communication buses (not shown). In some embodiments, the communication bus may also interconnect with network bridge 322 and device interconnect adapter 324.

CPU 332 may sometimes be called CPU, processor, or hardware processor, and sometimes implemented using microprocessors, microcontrollers, or the like, configured to execute instructions in operating system 338 and one or more programs. In some embodiments, CPU 332 may be shared with network bridge 322 and/or device interconnect adapter 324. CPU 332 may use operating memory 334 and/or persistent memory 336 for executing operating system 338 and one or more programs in compute complex 330.

Operating memory 334 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Operating memory 334 may optionally include one or more storage devices remotely located from CPU 332. In some embodiments, operating memory 334, or the non-transitory computer readable storage medium of operating memory 334 may stores programs, modules, and data structures for executing host commands, storage device management functions, host offload services, etc. Operating memory 334, or alternatively the non-volatile memory device(s) within memory 320, comprises a non-transitory computer readable storage medium.

In some embodiments, one or more additional memories may be provided for specific functions, such as persistent memory 336 for storing an image of operating system 338. In some embodiments, persistent memory 336 may also include one or more remotely addressable memories, such as a buffer memory accessible through remote direct memory access (RDMA) protocols. Compute complex 330 may include any number of additional functional memories and/or specialized chipsets, hardware/software engines, etc. that may provide specialized processing, hardware acceleration, and/or other resources related to their function.

In some embodiments, operating system 338 supports the basic functions of CPU 332, operating memory 334, and operating system 338. Operating system 338 may initialize, operate, and control compute complex 330 independent of host 302 and storage devices 350. In some embodiments, operating system 338 may also support the basic functions of network bridge 322 and/or device interconnect adapter 325 and the hardware, software, and network communication protocols they support.

In some embodiments, compute complex 330 may be configured to support a compute-host channel 340 for communicating with host 302 and a compute-storage channel 342 for communicating with storage devices 350. For example, host commands from and responses to host 302 may be routed through compute-host channel 340 through network bridge 322 and bypass the resources of storage devices 350. Compute-host channel 340 and host-compute channel 312 may describe the same communication channel as configured at compute complex 330 and host 302 respectively. Data management commands and/or controller offload commands may be sent to storage devices 350 through compute-storage channel 342 and bypass host 302.

In some embodiments, some host commands received through compute-host channel 340 may result in compute complex 330 accessing, managing, or otherwise interacting with storage devices 350 in response to the host command. For example, where compute complex 330 is acting as a storage virtualization controller, host commands may initially be directed to compute complex 330 in order to coordinate use of host-storage channel 310 and initiate or manage host-storage interactions. In some embodiments, some storage-related messages from storage devices 350 received through compute-storage channel 342 may result in compute complex 330 communicating with host 302.

In some embodiments, network bridge 322 may include hardware and software for interconnecting with and communicating across network 304. For example, network bridge 322 may be configured to selectively receive and forward data frames from compute complex 330 and storage devices 350 to network 304 for routing to host 302. In some embodiments, one or more networking protocols may be supported by and implemented across network bridge 322. For example, network bridge 322 may support a packetized command channel utilizing internet protocols and a high-speed data channel using RDMA protocols. In some embodiments, host-storage channel 310, host-compute channel 312 (or compute-host channel 340), and/or compute-storage channel 342 may each implement multiple channels, such as a command channel and a data channel.

In some embodiments, device interconnect adapter 324 may provide an interconnect interface for physical connection and routing of multiple communication paths to each of storage devices 350, with or without device interconnect backplane 326. For example, device interconnect adapter 324 may have one or more ports for each of storage devices 350 or a multichannel connection to device interconnect back plane 326, which may have ports for each of storage devices 350. In some embodiments, device interconnect adapter 324 may include a router and/or switch for selectively receiving and forwarding data frames from storage devices 350 for routing to other storage devices 350, compute complex 330, and/or host 302 through network bridge 322.

Storage devices 350 may include any number of storage devices supported by device interconnect adapter 324 and/or device interconnect backplane 326. For example, an array of disk drives, such as SSDs, may be interconnected in groups of 10, 12, 16, or more in a unit or rack supported by interconnect fabric 328. In some embodiments, device interconnect backplane 326 may include a plurality of disk drive interfaces, such as SCSI, SATA, and/or Fibre Channel interfaces and may include both data and power channels.

In some embodiments, storage devices 350 may be configured for peer-to-peer communication through device interconnect backplane 326 and/or device interconnect adapter 324. For example, storage devices 350 may each have a storage device identifier for use in routing data frames between storage devices 350. In some embodiments, a storage-storage channel 352 may be defined for communication among storage devices 350 that bypasses communication with compute complex 330 and host 302. For example, storage-storage channel 352 may enable routing and/or broadcast of packetized command messages among storage devices 350. In some embodiments, device interconnect adapter 324 may integrate a router for communications among storage devices 350. In some embodiments, storage devices 350 may include remotely addressable memories and support use of RDMA protocols for accessing the remotely addressable memories of other storage devices in the array or a defied peer group.

Figure 4:
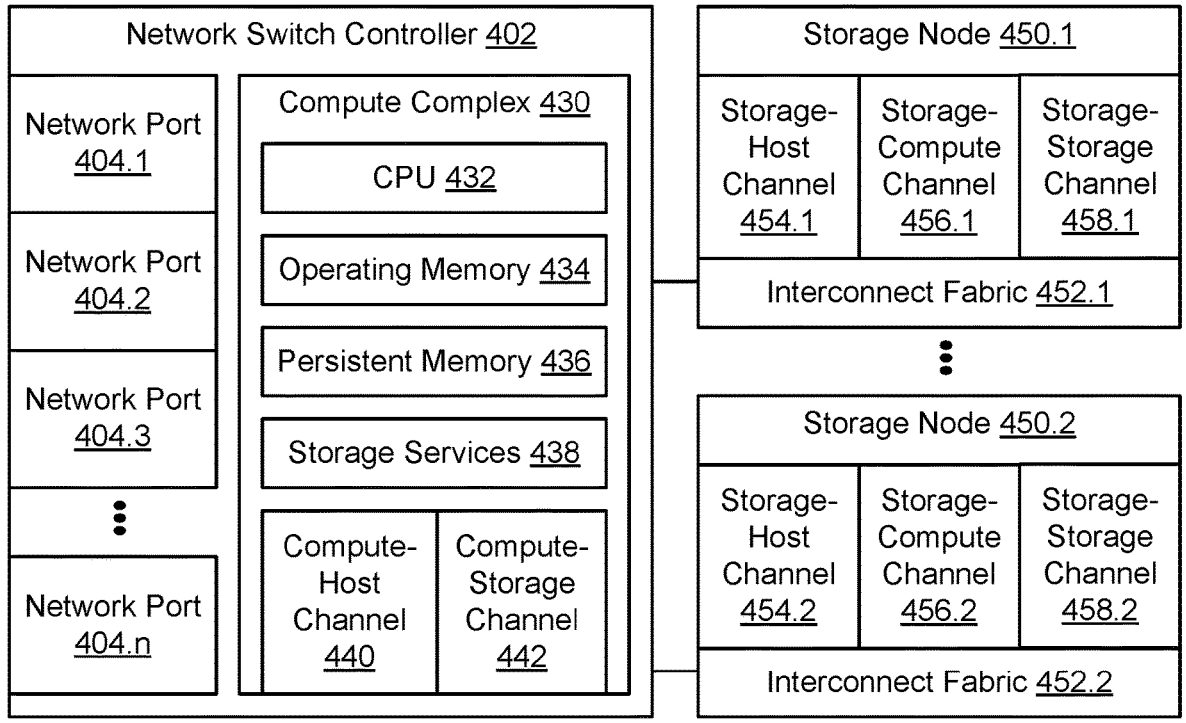
FIG. 4 schematically illustrates an example of a multi-channel storage system with a compute complex in a network switch controller.

FIG. 4 is a block diagram illustrating a data storage system 400 implementing a multichannel architecture among a compute complex 430 embedded in a network switch controller 402, storage nodes 450, and one or more host systems (not shown) interconnected through network ports 404, in accordance with some embodiments. In the embodiment shown, network switch controller 402 interfaces with the interconnect fabrics 452 of storage nodes 450. For example, interconnect fabrics 452 may include network interfaces compatible with network ports 404. While only two storage nodes 450 are shown connected to network switch controller 402, any practical number of storage nodes may interface with network switch controller 402 based on the available network ports 404 or other interface options.

In some embodiments, network switch controller 402 provides the networking logic for a network switch serving storage nodes 450. For example, network switch controller 402 may act as a multiport network bridge to process and forward data frames to and from network ports 404. In some embodiments, network switch controller 402 may include routing functionality for one or more networking protocols. While network switch controller 402 is shown supporting four network ports 404, any number of network ports may be possible and network switches supporting 10, 24, 36, 50 or more ports may be incorporate network switch controller 402. Network switch controller 402 may act as a network communication module configured for communication through network ports 404 as network interfaces for connecting to a LAN, WAN, internet, or similar network.

In some embodiments, compute complex 430 may include a CPU 432, operating memory 434, and persistent memory 436 for supporting one or more storage services 438 from onboard network switch controller 402. For example, the compute resources (CPU 432, operating memory 434, and/or persistent memory 436) may be included on the same board or in the same package as compute resources for network switch controller 402's network switch functions. In some embodiments, compute complex 430 may provide some or all of the compute resources for network switch controller 402. For example, CPU 432, operating memory 434, and/or persistent memory 436 may provide compute resources for addressing and switching among network ports 404 and/or providing processing, routing, and forwarding of data frames.

In some embodiments, compute complex 430 may be configured to support a compute-host channel 440 for communicating with a host (not shown) and a compute-storage channel 442 for communicating with storage devices in storage nodes 450. For example, host commands from and responses to a host may be routed through compute-host channel 440 and at least one of network ports 404 and bypass the resources of storage nodes 450. Data management commands and/or controller offload commands may be sent to storage nodes 450 through compute-storage channel 442 and bypass a host and/or the host network.

In some embodiments, compute complex 430 may support a plurality of storage services 438 that may include or support communication through compute-host channel 440 and/or compute-storage channel 442. For example, storage services 438 may include storage controller functions, such as host LBA management, RAID management, global garbage collection, lifecycle data and/or storage device management, and similar storage-related services. In some embodiments, storage services 438 may include host services that have been offloaded to compute complex 430. For example, compute complex 430 may be used by one or more hosts to offload query pre-processing, data filtering, and/or transformation to compute complex 430. In some embodiments, storage services 438 may include storage virtualization controller functions for managing host, RAID, and/or storage controller functions that have been offloaded to storage devices within storage nodes 450. In some embodiments, compute complex 430 may include specialized compute resources for data-centric processing tasks, such as image processing, artificial intelligence training, etc.

In some embodiments, storage nodes 450 may include hardware and software interfaces for a plurality of storage devices, such as a unit or rack of storage devices arranged in a storage array or similar grouping. Each of storage nodes 450 may include or interface with interconnect fabrics 452 for interconnecting the plurality of storage devices and directing communication to and from those storage devices. In some embodiments, storage nodes 450 may be configured similarly to storage nodes 224 in FIG. 2.

In some embodiments, storage nodes 450 may be configured to support a storage-host channels 454 for communicating with a host (not shown), a storage-compute channels 456 for communicating with compute complex 430 in network switch controller 402, and a storage-storage channel for communicating among storage devices within and between storage nodes 450. For example, host commands from and responses to a host may be routed through storage-host channel 454 through interconnect fabric 452 and network switch controller 402 and bypass the resources of compute complex 430 (at least as far as they relate to storage services 438). Data management commands and/or controller offload commands may be sent between storage nodes 450 and compute complex 430 through storage-compute channel 456 and bypass a host and/or the host network. Peer-to-peer communication, including data transfers and data management commands, may be sent through storage-storage channel 458 between storage devices in and among storage nodes 450 and bypass both compute complex 430 and any host network. In some embodiments, storage-storage channel 454 may rely solely on interconnect fabrics 452 and not direct communication through network switch controller 402.

Compute-storage channel 442 and storage-compute channels 456 may be the same channels and merely reflect the originating and destination system of any particular communication. While not shown, host-storage channels equivalent to storage-host channels 454 and host-compute channels equivalent to compute-host channel 440 may also be present in some embodiments.

Figure 5:
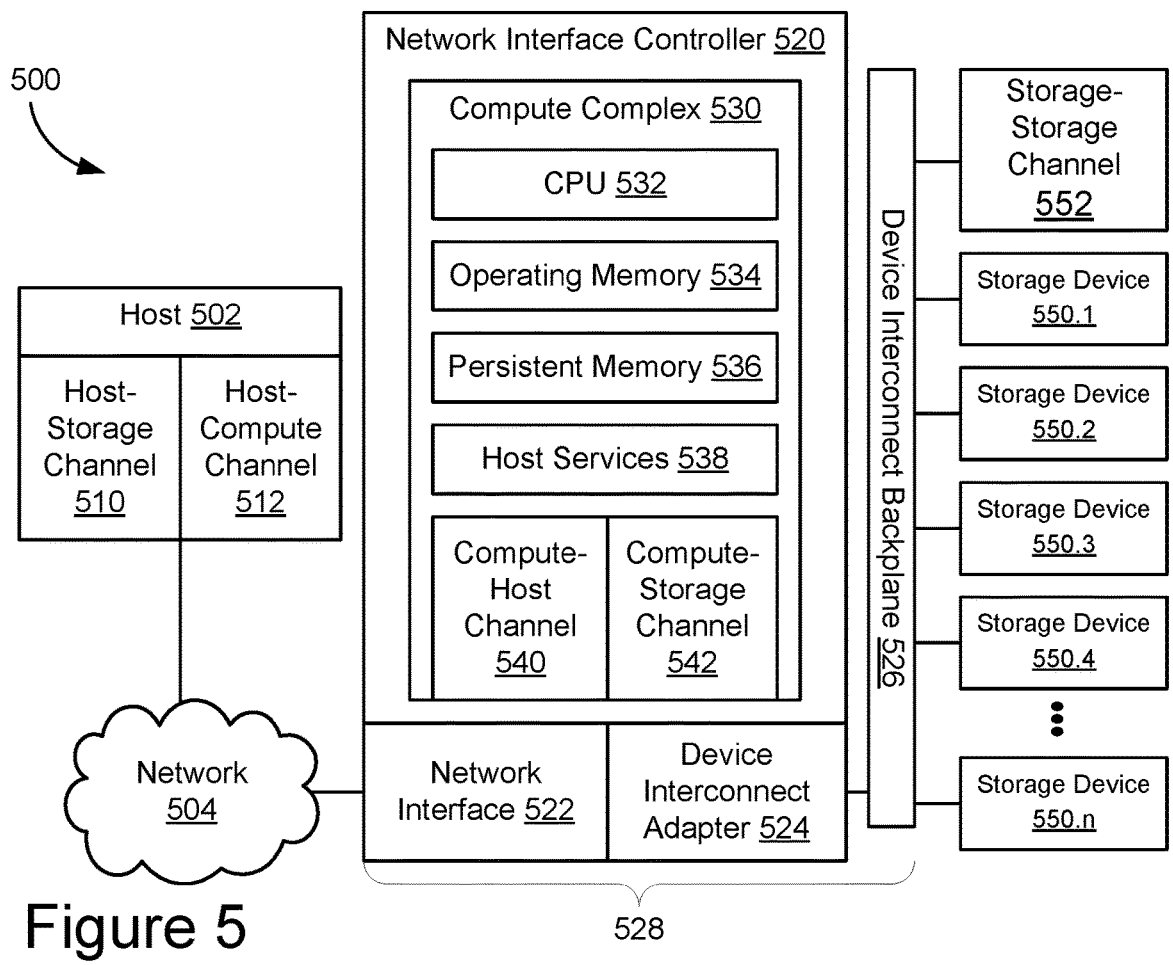
FIG. 5 schematically illustrates an example of a multi-channel storage system with a compute complex in a network interface controller.

FIG. 5 is a block diagram illustrating a data storage system 500 implementing a multichannel architecture among a host 502, a compute complex 530 embedded in a network interface controller 520, and storage devices 550, in accordance with some embodiments. In the embodiment shown, network interface controller 520 interfaces with a network 504 through a network interface 522. Network interface controller 520 may interface with a device interconnect backplane 526 through a device interconnect adapter 524 to form at least a portion of an interconnect fabrics 528 of storage devices 550. In some embodiments, redundant versions of network interface controller 520 may provide redundant channels among host 502, compute complex 530, and storage devices 550.

In some embodiments, host 502 may be a host controller similar to host node 202.1 in FIG. 2 and/or host 102 in FIG. 1. Host 502 may support one or more applications supported by data stored in storage devices 550. In some embodiments, host 502 may be part of or interface with any number of storage systems, including storage system 500. Host 502 may include application-level data abstractions and data storage protocols that define logical block addresses, file systems, object storage systems, or other logical architectures for storing and accessing data stored in storage devices 550. Host 502 may implement application-level data management for configuring and accessing data stored in storage devices 550. In some embodiments, host 502 may generate host data commands for accessing and managing data stored in storage devices 550.

In some embodiments, host 502 may be configured to support a host-storage channel 510 for communicating with storage devices 550 and a host-compute channel 512 for communicating with compute complex 530. For example, host data for transfer to or from storage devices 550 may be routed through host-storage channel 510 through network interface 522 and device interconnect adapter 524 and bypass the resources of compute complex 530. Data management commands and/or host offload commands may be sent to compute complex 530 through host-compute channel 512 and bypass storage devices 550. In some embodiments, some host commands may be directed through host-compute channel 512 and result in compute complex 330 accessing, managing, or otherwise interacting with storage devices 550 in response to the host command. For example, where compute complex 530 is acting as a storage virtualization controller, host commands may initially be directed to compute complex 530 in order to coordinate use of host-storage channel 510 and initiate or manage host-storage interactions.

In some embodiments, network interface controller 520 may be a network communication module that provides the physical and data link interface for connecting storage devices 550 to network 504, such as a host network, LAN, WAN, or internet. For example, network interface controller 520 may be a network interface card or other form factor device for engaging a data bus or other interconnect for device interconnect adapter 524 and/or device interconnect backplane 526. In some embodiments, network interface controller 520, including network interface 522, may be integrated into the same hardware as device interconnect adapter 524 and provide ports for connecting to storage devices 550 and/or an interface for device interconnect backplane 526. In some embodiments, network interface controller 520 may support a wired networking protocol and interface, such as Ethernet. In some embodiments, network interface controller 520 may support a wireless networking protocol and interface, such as Wi-Fi. Network interface controller 520 may include support for RDMA. In some embodiments, network interface controller 520 may include routing functionality for one or more networking protocols and/or may include on-controller processing for one or more protocols or related acceleration engines.

In some embodiments, compute complex 530 may include a CPU 532, operating memory 534, and persistent memory 536 for supporting one or more host services 538 from onboard network interface controller 520. For example, the compute resources (CPU 532, operating memory 534, and/or persistent memory 536) may be included on the same board or in the same package as compute resources for network interface controller 520's network interface functions. In some embodiments, compute complex 530 may provide some or all of the compute resources for network interface controller 520. For example, CPU 532, operating memory 534, and/or persistent memory 536 may provide compute resources for provisioning network interface 522 and/or providing processing, routing, and forwarding of data frames.

In some embodiments, compute complex 530 may be configured to support a compute-host channel 540 for communicating with host 502 and a compute-storage channel 542 for communicating with storage devices 550. For example, host commands from and responses to host 502 may be routed through compute-host channel 540 and network interface 522 and bypass the resources of storage nodes 550. Data management commands and/or controller offload commands may be sent to storage devices 550 through compute-storage channel 542 and bypass host 502 and/or network 504.

In some embodiments, compute complex 530 may support a plurality of host services 538 that may include or support communication through compute-host channel 540 and/or compute-storage channel 542. For example, host services 538 may include host controller functions, such as global LBA management, global RAID management, global garbage collection, lifecycle data and/or storage device management, and similar storage-related services. In some embodiments, host services 538 may include host services that have been offloaded to compute complex 530. For example, compute complex 530 may be used by one or more hosts to offload query pre-processing, data filtering, and/or transformation to compute complex 430. In some embodiments, compute complex 430 may include specialized compute resources for data-centric processing tasks sometimes handled at the host or application level, such as image processing, artificial intelligence training, etc., and these resources may be accessed as part of host services 538.

Storage devices 550 may include any number of storage devices supported by device interconnect adapter 524 and/or device interconnect backplane 526. For example, an array of disk drives, such as SSDs, may be interconnected in groups of 10, 12, 16, or more in a unit or rack supported by interconnect fabric 528. In some embodiments, device interconnect backplane 526 may include a plurality of disk drive interfaces, such as SCSI, SATA, and/or Fibre Channel interfaces and may include both data and power channels.

In some embodiments, storage devices 550 may be configured for peer-to-peer communication through device interconnect backplane 526 and/or device interconnect adapter 524. For example, storage devices 550 may each have a storage device identifier for use in routing data frames between storage devices 350. In some embodiments, a storage-storage channel 552 may be defined for communication among storage devices 550 that bypasses communication with compute complex 530 and host 502. For example, storage-storage channel 552 may enable routing and/or broadcast of packetized command messages among storage devices 550. In some embodiments, device interconnect adapter 524 may integrate a router for communications among storage devices 550. In some embodiments, storage devices 350 may include remotely addressable memories and support use of RDMA protocols for accessing the remotely addressable memories of other storage devices in the array or a defied peer group.

Figure 6:
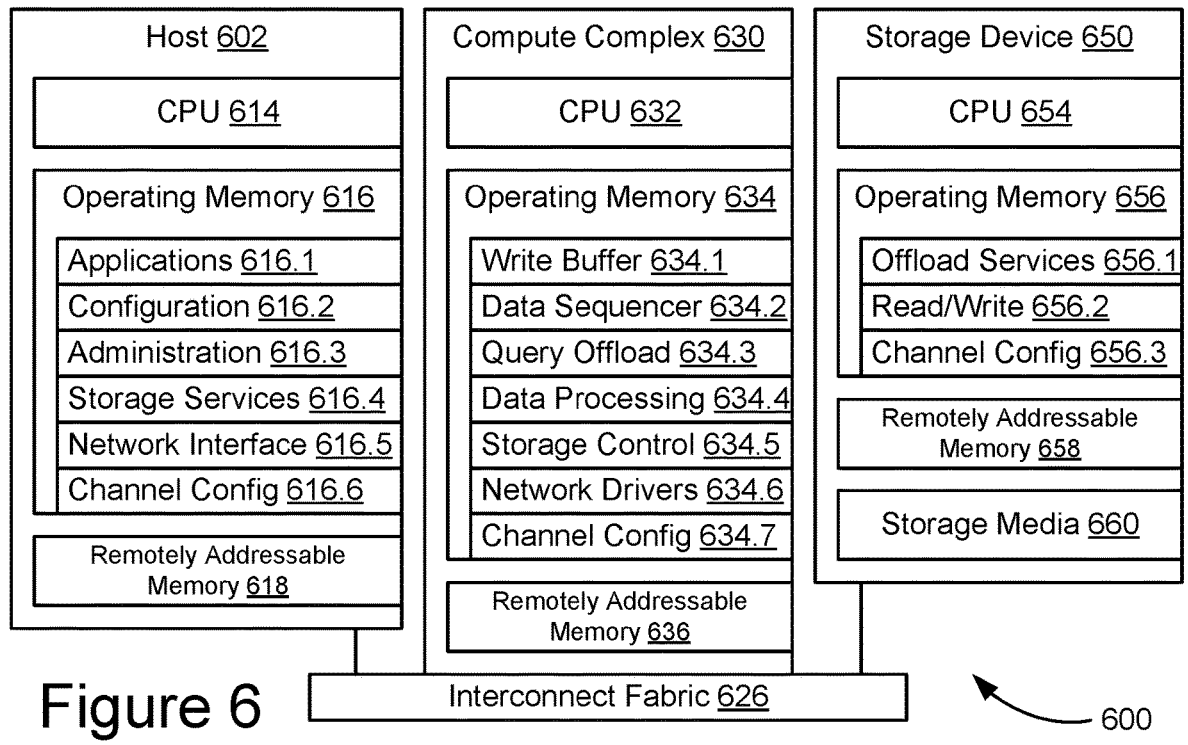
FIG. 6 schematically illustrates example host, compute complex, and storage device configurations of a multichannel storage system.

FIG. 6 is a block diagram illustrating a data storage system 600 implementing a multichannel architecture among a host 602, a compute complex 630, and example storage devices 650, in accordance with some embodiments. In the embodiment shown, host 602, compute complex 630, and storage device 650 communicate by sending data through interconnect fabric 626 and may be configured with dedicated channels between and among specific components (while bypassing others) as described above. Interconnect fabric 626 may include a combination of network and component interfaces and protocols for supporting physical layer and data layer connections among host 602, compute complex 630, and storage device 650. Each system component provides a variety of compute resources for contributing to data storage system 600. While only a single instance of each system component (host 602, compute complex 630, and storage device 650) is shown, any number of each system component may be present, including a plurality of storage devices in a storage group or storage array. In some embodiments, compute complex 630 is integrated within interconnect fabric 626.

In some embodiments, host 602 may include a server or similar computer system for hosting one or more applications using data stored on storage device 650. Host 602 may include integrated compute resources, such as CPU 614, operating memory 616, and remotely addressable memory 618. In some embodiments, operating memory 616 and/or remotely addressable memory 618 may include at least a portion of persistent memory. In some embodiments, remotely addressable memory 618 may include one or more memory locations, such as a memory buffer, accessible to other systems using network and remote memory access protocols, such as RDMA protocols over Ethernet. In some embodiments, host 602 is an independent computer system from compute complex 630 and storage device 650 with its own provisioning, operating system, device/network address (es), operating cycles, and, in many cases, administrators.

Operating memory 616, or alternatively the non-volatile memory device(s) within operating memory 616, comprises a non-transitory computer readable storage medium. In some embodiments, operating memory 616, or the non-transitory computer readable storage medium of operating memory 616 stores the following programs, modules, and data structures, or a subset or superset thereof:

applications 616.1 for providing administrator and/or end-user access to and use of host data stored in storage device 650 for business, consumer, mobile, information technology infrastructure management, etc. computer applications;

configuration 616.2 for configuring and provisioning storage system 600 and/or metadata related to application, system, and/or global use of storage system 600 for host data;

administration 616.3 for administrative data and tools for managing storage system 600 and its components, including host 602, compute complex 630, storage device(s) 650, and interconnect fabric 626;

storage services 616.4 for managing host data storage, retrieval, processing, redundancy, integrity, security, etc., including the offloading of application, system, and/or global host data query and/or processing to compute complex 630 and/or storage device(s) 650;

network interface 616.5 for data layer connection and communication of data through interconnect fabric 626 and/or other network resources to compute complex 630, storage device 650, and/or other user, application, or storage systems;

channel configurations 616.6 for defining multiple channels for communication with compute complex 630 and storage devices 650, such as at least one host-compute channel and at least one host-storage channel.

Each of the above identified elements may be stored in one or more of memory devices that together form operating memory 616 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, operating memory 616 may store a subset of the modules and data structures identified above. Furthermore, operating memory 616 may store additional modules and data structures not described above. In some embodiments, the programs, modules, and data structures stored in operating memory 616, or the non-transitory computer readable storage medium of operating memory 616, provide instructions for implementing respective operations of the methods described below. In some embodiments, some or all of these modules may be implemented with specialized hardware circuits that subsume part or all of the module functionality.

In some embodiments, compute complex 630 may include, attach to, or be integrated into a network interface controller, network switch, backplane, or similar network fabric system for providing one or more storage-related functions for host 502 and/or storage device 650, in addition to any network-related functions. In some embodiments, compute complex 630 may replace or reduce the use of storage controllers and/or RAID controllers within storage system 600. Compute complex 630 may include integrated compute resources, such as CPU 632, operating memory 634, and remotely addressable memory 636. In some embodiments, operating memory 634 and/or remotely addressable memory 636 may include at least a portion of persistent memory. In some embodiments, remotely addressable memory 636 may include one or more memory locations, such as a memory buffer, accessible to other systems using network and remote memory access protocols, such as RDMA protocols over Ethernet. In some embodiments, compute complex 630 is an independent computer system from host 602 and storage device 650 with its own provisioning, operating system, device/network address(es), operating cycles, and, in many cases, administrators.

Operating memory 634, or alternatively the non-volatile memory device(s) within operating memory 634, comprises a non-transitory computer readable storage medium. In some embodiments, operating memory 634, or the non-transitory computer readable storage medium of operating memory 634 may store some or all of the following programs, modules, and data structures, or a subset or superset thereof:

write buffer 634.1 for buffering and/or managing the use of remotely addressable buffer memories (e.g. remotely addressable memory 658) in storage device 650 for receiving host data;

data sequencer 634.2 for organizing host data reads and writes for processing by storage device 650, including data serialization tasks and the aggregation of host write blocks into larger device write (or programming) blocks;

query offload 634.3 for host offload of data query pre-processing or post-processing tasks using compute resources of compute complex 630 to supplement or replace use of compute resources by host 502;

data processing 634.4 for host offload of processing host data on storage device(s) 650 for specific data content and data relationship purposes, such as image processing, artificial intelligence training, data mapping, data structuring, data mining, etc., using compute resources of compute complex 630 to supplement or replace use of compute resources by host 502;

storage control 634.5 for providing one or more storage control functions for storage device(s) 650, such as LBA management, RAID management, garbage collection, etc., to supplement or replace use of separate storage controllers and/or RAID controllers;

network drivers 634.6 for providing network-related functions, such as network interface controller, network switch controller, network router, etc., to support interconnect fabric 626 using compute resources of compute complex 630;

channel configurations 634.7 for defining multiple channels for communication with host 602 and storage devices 650, such as at least one compute-host channel and at least one compute-storage channel.

Each of the above identified elements may be stored in one or more of memory devices that together form operating memory 634 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, operating memory 634 may store a subset of the modules and data structures identified above. Furthermore, operating memory 634 may store additional modules and data structures not described above. In some embodiments, the programs, modules, and data structures stored in operating memory 634, or the non-transitory computer readable storage medium of operating memory 634, provide instructions for implementing respective operations of the methods described below. In some embodiments, some or all of these modules may be implemented with specialized hardware circuits that subsume part or all of the module functionality.

In some embodiments, storage device 650 may be a disk drive from an array of disk drives as described above with regard to FIG. 1. Storage device may include integrated compute resources, such as CPU 654, operating memory 656, and remotely addressable memory 658, in addition to storage media 660, such as a plurality of NVM media devices. In some embodiments, operating memory 656 and/or remotely addressable memory 658 may include at least a portion of persistent memory. In some embodiments, remotely addressable memory 658 may include one or more memory locations, such as a memory buffer, accessible to other systems using network and remote memory access protocols, such as RDMA protocols over Ethernet. In some embodiments, storage device 650 is an independent computer system component from host 602 and compute complex 630 with its own provisioning, operating system, device/network address(es), operating cycles, and, in many cases, administrators. In some embodiments, storage device 650 is one of a plurality of storage devices configured in a storage array or storage group and capable of peer-to-peer communication of data through interconnect fabric 626.

Operating memory 656, or alternatively the non-volatile memory device(s) within operating memory 656, comprises a non-transitory computer readable storage medium. In some embodiments, operating memory 656, or the non-transitory computer readable storage medium of operating memory 656 may store the following programs, modules, and data structures, or a subset or superset thereof:

offload services 656.1 for processing of host, RAID, and/or storage controller functions, such as RAID management tasks, host LBA management tasks, host FTL management tasks, garbage collection tasks, etc., using compute resources of storage device 650 and/or peer storage devices to supplement or replace use of compute resources by host 502, compute complex 630, and/or storage, storage virtualization, or RAID controllers;

read/write 656.2 for managing read/write operations of host data to/from storage media 660, including the direct transfer of host data to/from host 602, compute complex 630, and/or peer storage devices;

channel configurations 656.3 for defining multiple channels for communication with host 602, compute complex 630, and peer storage devices, such as at least one storage-host channel, at least one storage-compute channel, and at least one storage-storage channel.

Each of the above identified elements may be stored in one or more of memory devices that together form operating memory 656 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, operating memory 656 may store a subset of the modules and data structures identified above. Furthermore, operating memory 656 may store additional modules and data structures not described above. In some embodiments, the programs, modules, and data structures stored in operating memory 656, or the non-transitory computer readable storage medium of operating memory 656, provide instructions for implementing respective operations of the methods described below. In some embodiments, some or all of these modules may be implemented with specialized hardware circuits that subsume part or all of the module functionality.

Figure 7:
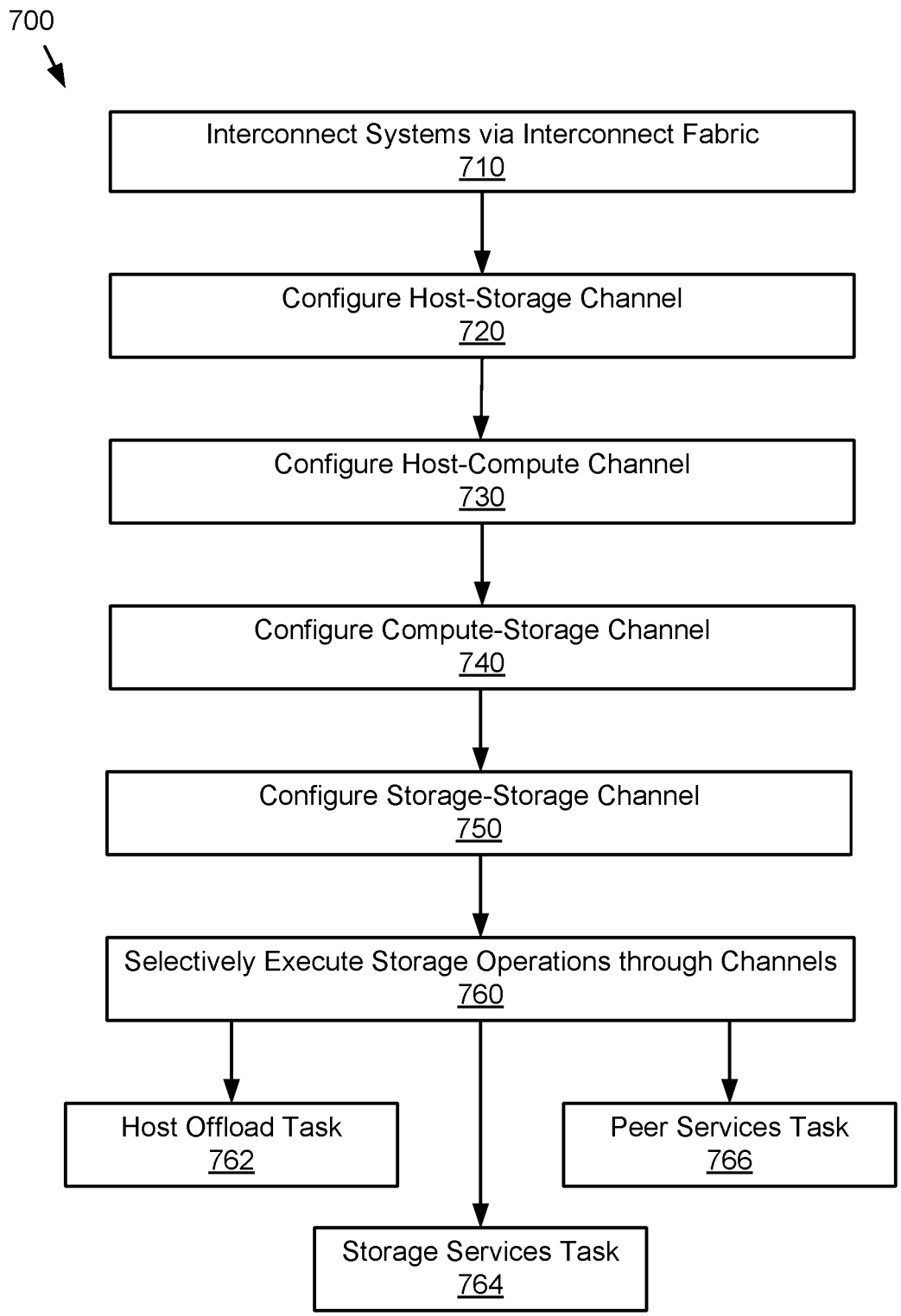
FIG. 7 illustrates an example of a method for configuring and using a multichannel storage system.

As shown in FIG. 7, data storage systems 100, 200, 300, 400, 500, and 600 may be configured and operated according to data storage operations selectively using multiple channels for communication of data among relevant systems while bypassing other systems. For example, data storage systems 100, 200, 300, 400, 500, and 600 may be configured and used to handle various storage-related tasks according to the method 700 illustrated by blocks 710-764 of FIG. 7.

At block 710, system components may be interconnected via an interconnect fabric. For example, one or more host systems, compute complexes, and storage devices may be connected to an interconnect fabric using one or more types of physical interfaces and data communication protocols. In some embodiments, the host systems may be connected to a network fabric, such as a LAN, WAN, or internet infrastructure, using one or more network interfaces, compute complexes may be built into or connected to one or more components of network hardware, such as network switches or interface controllers, and storage devices may be connected to a storage backplane or similar configuration for connecting an array of storage devices. Interconnecting the system components may include establishing both a physical layer network connection and a data layer connection that enables uniquely addressing each of the system components. In some embodiments, the interconnect fabric may support: non-volatile memory over fabric (NVMe over Fabric), peripheral component interconnect express (PCIe), InfiniBand (IB), Omni-Path, RDMA over converged ethernet (RoCE), Fibre Channel over Fabric and/or internet wide-area RDMA protocol (iWARP).

At block 720, a host-storage channel (also referred to as a storage-host channel) may be configured between the host and at least one storage device. The host-storage channel may enable transfer of command messages and/or host data directly from host memory to storage device memory without passing through any compute complexes (except insofar as they are part of the network protocols for the interconnect fabric between the host and the storage device). Configuring the host-storage channel may include providing network addresses and protocols at both the host and storage device and assuring compatibility with the network protocols enabled by the intervening interconnect fabric such that data frames may be correctly sent, forwarded/routed, and received while bypassing the compute complex. Configuring the host-storage channel may also include enabling one or more storage services, such as data transfer, data management, or host offload services, on both the host and storage device.

At block 730, a host-compute channel (also referred to as a compute-host channel) may be configured between the host and at least one compute complex. The host-compute channel may enable transfer of command messages and/or host data directly from host memory to compute complex memory without passing through any storage devices. Configuring the host-compute channel may include providing network addresses and protocols at both the host and compute complex and assuring compatibility with the network protocols enabled by the intervening interconnect fabric such that data frames may be correctly sent, forwarded/ routed, and received while bypassing the storage devices. Configuring the host-compute channel may also include enabling one or more storage services, such as data transfer, data management, or host offload services, on both the host and compute complex.

At block 740, a compute-storage channel (also referred to as a compute-storage channel) may be configured between at least one compute complex and one or more storage devices. The compute-storage channel may enable transfer of command messages and/or host data directly from compute complex memory to storage device memory without passing through the host. Configuring the compute-storage channel may include providing network addresses and protocols at both the compute complex and storage device and assuring compatibility with the network protocols enabled by the intervening interconnect fabric such that data frames may be correctly sent, forwarded/routed, and received while bypassing the host. Configuring the compute-storage channel may also include enabling one or more storage services, such as data transfer, data management, or host offload services, on both the compute complex and the storage devices.

At block 750, a storage-storage channel (also referred to as a peer-to-peer storage channel) may be configured between at least two or more storage devices. The storage-storage channel may enable transfer of command messages and/or host data directly from the memory of one storage device to the memory of another storage device without passing through the host or compute complex. Configuring the storage-storage channel may include providing network addresses, such as storage device identifiers, and protocols at both storage devices and assuring compatibility with the network protocols enabled by the intervening interconnect fabric such that data frames may be correctly sent, forwarded/routed, and received while bypassing the host. Configuring the storage-storage channel may also include enabling one or more peer storage services, such as data transfer, data management, or coordinated host offload services, on the storage devices.

At block 760, storage operations may be selectively executed to communicate data through the configured channels between the systems relevant to the operation. For example, some storage operations may only require communication between the host and a selected storage device, between the host and the compute complex, between the compute complex and a selected storage device, or between two or more storage devices. A host storage operation may include communication between the host and a selected storage device. In some embodiments, the storage operation may include a host offload task at block 762 between the host and the compute complex or the host and the storage devices. In some embodiments, the storage operation may include a storage services task at block 764 that may include communication through any of the configured channels. In some embodiments, the storage operation may include a peer services task at block 766 between two or more storage devices. A peer storage operation may include communication between a selected storage device and another peer storage device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
   a compute subsystem comprising:
      a subsystem processor;
      a subsystem operating memory; and
      a host offload services module configured to use the subsystem processor and the subsystem operating memory to execute a host offload task received over a network interface from a host system, wherein the host offload task includes data-centric processing in addition to storage controller functions for a plurality of storage devices; and
   an interconnect fabric interconnecting the plurality of storage devices, the network interface, and the compute subsystem, wherein the interconnect fabric comprises:
      a network communication module configured for communication through the network interface to the host system; and
      a device interconnect module configured for communication with at least the plurality of storage devices; and
   a channel configuration comprising:
      a host-storage channel configured for communication between the host system and the plurality of storage devices that bypasses the compute subsystem;
      a host-compute channel configured for communication between the host system and the compute subsystem that bypasses the plurality of storage devices; and
      a compute-storage channel configured for communication between the compute subsystem and the plurality of storage devices that bypasses the host system.

2. The storage system of claim 1,
   wherein each storage device in the plurality of storage devices comprises:
      a storage processor;
      a storage operating memory;
      at least one storage medium; and
      an interconnect interface in communication with the interconnect fabric,
   wherein the channel configuration further comprises a storage-storage channel configured for communication among the plurality of storage devices that bypasses the host system and the compute subsystem.

3. The storage system of claim 2, wherein:
   each storage device in the plurality of storage devices further comprises a storage remotely addressable memory configured for access through the interconnect fabric; and
   the host-storage channel is further configured for data transfers between the host system and the plurality of storage devices using the storage remotely addressable memory.

4. The storage system of claim 2, wherein:
   each storage device in the plurality of storage devices further comprises an offload services module; and
   the offload services module is configured to use the storage processor and the storage operating memory to execute an offload task received over the interconnect fabric from an offloading system selected from the host system or the compute subsystem.

5. The storage system of claim 4, wherein the offload task does not use the at least one storage medium.

6. The storage system of claim 1, wherein the interconnect fabric supports at least one communication protocol selected from:
   non-volatile memory over fabric (NVMe over Fabric);
   peripheral component interconnect express (PCIe);
   InfiniBand (IB);
   Omni-Path;
   remote direct memory access (RDMA) over converged ethernet (RoCE);
   Fibre Channel over fabric; and
   internet wide-area RDMA protocol (iWARP).

7. The storage system of claim 1, wherein:
   the compute subsystem further comprises a compute remotely addressable memory configured for access through the interconnect fabric; and
   the compute-storage channel is further configured for data transfers between the compute subsystem and the plurality of storage devices using the compute remotely addressable memory.

8. The storage system of claim 1, wherein:
   the compute subsystem further comprises a compute remotely addressable memory configured for access through the network interface; and
   the host-compute channel is further configured for data transfers between the compute subsystem and the host system using the compute remotely addressable memory.

9. The storage system of claim 1, wherein the host offload task is selected from:
   a data query processing offload task;
   a data content processing offload task; and
   a data relationship processing offload task.

10. The storage system of claim 1, wherein the compute subsystem further comprises:
    a storage services module configured to use the subsystem processor and the subsystem operating memory to execute at least one storage services task for managing the plurality of storage devices.

11. The storage system of claim 10, wherein the storage services task is selected from:
    a write buffering task;
    a data serialization task;

a redundant array of independent disks (RAID) management task;
a host flash translation layer (FTL) management task; and
a host logical block address management task.

12. The storage system of claim 1, wherein the compute subsystem further comprises:
at least one interface protocol driver configured to use the subsystem processor and the subsystem operating memory to execute at least one communication protocol for at least one communication channel selected from the network interface or the interconnect fabric.

13. A computer-implemented method, comprising:
interconnecting a plurality of storage devices, a host system, and a compute subsystem for communication over an interconnect fabric, wherein the compute subsystem comprises a subsystem processor and a subsystem operating memory;
configuring a host-storage channel for communication over the interconnect fabric between the host system and the plurality of storage devices that bypasses the compute subsystem;
configuring a host-compute channel for communication over the interconnect fabric between the host system and the compute subsystem that bypasses the plurality of storage devices;
configuring a compute-storage channel for communication over the interconnect fabric between the compute subsystem and the plurality of storage devices that bypasses the host system;
executing a host storage operation from the host system to the plurality of storage devices, wherein host data is transferred through the host-storage channel; and
executing a host offload task using the subsystem processor and the subsystem operating memory, wherein:
the compute subsystem receives the host offload task over the interconnect fabric from the host system; and
the host offload task includes data-centric processing in addition to storage controller functions for the plurality of storage devices.

14. The computer-implemented method of claim 13, further comprising:
configuring a storage-storage channel for communication over the interconnect fabric among the plurality of storage devices that bypasses the host system and the compute subsystem; and
executing a peer storage operation between a first storage device of the plurality of storage devices and a second storage device of the plurality of storage devices.

15. The computer-implemented method of claim 13, wherein each storage device in the plurality of storage devices comprises a storage processor, a storage operating memory, and at least one storage medium, and further comprising:

executing a host offload task using the storage processor and the storage operating memory, wherein the host offload task is received over the interconnect fabric from the host system.

16. The computer-implemented method of claim 13, further comprising:
executing at least one storage services task using the subsystem processor and the subsystem operating memory, wherein the at least one storage services task manages the plurality of storage devices over the interconnect fabric.

17. The computer-implemented method of claim 13, further comprising:
executing at least one communication protocol for the interconnect fabric using the subsystem processor and the subsystem operating memory.

18. A storage system, comprising:
a plurality of storage devices;
a host system;
a compute subsystem comprising:
a subsystem processor; and
a subsystem operating memory;
means for interconnecting the plurality of storage devices, the host system, and the compute subsystem for communication over an interconnect fabric;
means for configuring a host-storage channel for communication over the interconnect fabric between the host system and the plurality of storage devices that bypasses the compute subsystem;
means for configuring a host-compute channel for communication over the interconnect fabric between the host system and the compute subsystem that bypasses the plurality of storage devices;
means for configuring a compute-storage channel for communication over the interconnect fabric between the compute subsystem and the plurality of storage devices that bypasses the host system; and
means for executing a host offload task received by the compute subsystem from the host system over the host-compute channel, wherein:
the compute subsystem is configured to execute the host offload task using the subsystem processor and the subsystem operating memory; and
the host offload task includes data-centric processing in addition to storage controller functions for the plurality of storage devices.

19. The storage system of claim 1, wherein the interconnect fabric further comprises the compute subsystem.

20. The storage system of claim 19, wherein:
the network communication module is configured to use the subsystem processor and the subsystem operating memory; and
the device interconnect module is configured to use the subsystem processor and the subsystem operating memory.

* * * * *